(12) United States Patent
Walters et al.

(10) Patent No.: US 8,186,637 B2
(45) Date of Patent: May 29, 2012

(54) MEDIA DEVICE MOUNTING SYSTEM (75) Inventors: James D. Walters, Saint Charles, IL (US); Edward Bielski, Willow Springs, IL (US)

(73) Assignee: Peerless Industries, Inc., Aurora, IL (US)

(*) Notice: Subject to any disclaimer, the term of this patent is extended or adjusted under 35 U.S.C. 154(b) by 196 days.

(21) Appl. No.: 12/579,944

(22) Filed: Oct. 15, 2009

(65) Prior Publication Data

US 2011/0089300 A1    Apr. 21, 2011

(51) Int. Cl.
*E04G 3/00* (2006.01)

(52) U.S. Cl. ............... 248/279.1; 248/919; 248/222.51; 248/299.1

(58) Field of Classification Search ............ 248/917, 248/919, 920, 222.51, 299.1, 921, 922, 274.1, 248/278.1, 279.1, 222.52, 282.1
See application file for complete search history.

(56) References Cited

U.S. PATENT DOCUMENTS

| | | | | |
|---|---|---|---|---|
| 5,799,917 A * | 9/1998 | Li | | 248/284.1 |
| 5,924,665 A * | 7/1999 | Sweere et al. | | 248/285.1 |
| 6,042,068 A | 3/2000 | Tcherny | | |
| 6,361,012 B1 * | 3/2002 | Chang | | 248/324 |
| D480,100 S | 9/2003 | Lam | | |
| 6,695,376 B1 * | 2/2004 | Hirano | | 296/37.7 |
| D504,305 S | 4/2005 | Gillespie | | |
| 6,892,650 B2 * | 5/2005 | Baloga et al. | | 108/50.01 |
| 6,905,101 B1 | 6/2005 | Dittmer | | |
| 6,915,995 B2 * | 7/2005 | Gillespie | | 248/278.1 |
| D511,332 S * | 11/2005 | Vitito | | D14/132 |
| 7,090,186 B2 * | 8/2006 | Quinno et al. | | 248/324 |
| 7,156,359 B2 | 1/2007 | Dittmer | | |
| 7,369,672 B2 * | 5/2008 | Hirschhorn | | 381/333 |
| 7,497,412 B2 | 3/2009 | Dittmer et al. | | |
| D597,582 S | 8/2009 | Anderson et al. | | |
| D598,545 S | 8/2009 | Haines, III et al. | | |
| D602,514 S | 10/2009 | Dittmer | | |
| 7,650,671 B2 * | 1/2010 | Lee | | 16/362 |
| D609,552 S | 2/2010 | Anderson et al. | | |
| 7,988,111 B2 * | 8/2011 | Burge | | 248/222.52 |
| 2008/0179475 A1 | 7/2008 | Whitley et al. | | |

OTHER PUBLICATIONS

U.S. Appl. No. 12/562,523, filed Sep. 18, 2009, Anderson, et al.
U.S. Appl. No. 29/338,846, filed Jun. 19, 2009, Anderson, et al.

* cited by examiner

*Primary Examiner* — Terrell McKinnon
*Assistant Examiner* — Steven Marsh
(74) *Attorney, Agent, or Firm* — Foley & Lardner LLP (57) ABSTRACT

A mounting system configured to provide a plurality of image adjustments for a media device mounted thereon. A lower adapter plate is operatively connected to a media device top surface, the lower adapter plate being adjustably connected to an upper adapter plate. A support arm assembly is selectively coupled at a first end thereof to the upper adapter plate. A second end of the support arm assembly is coupled to a support bracket assembly that is configured to be adjustably mounted to a support structure. A plurality of adjustment mechanisms are secured to the adapter plate assembly at an upper adapter plate top surface, whereby operation of the adjustment mechanisms results in a corresponding movement of the media device.

21 Claims, 10 Drawing Sheets

MEDIA DEVICE MOUNTING SYSTEM

FIELD OF THE INVENTION

The present invention relates generally to mounting systems. More particularly, the present invention relates to wall mounting systems for use with devices such as projectors.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mounting display devices such as projectors can be a challenging task. In the case of a projector, for example, if the projector is mounted improperly, the quality of the image the device projects may suffer. Image quality depends on several factors, including the distance between the projector and the screen upon which the image is projected and the positioning of the projector. Problems concerning the distance of the projector from the screen and the positioning of the projector become of greater concern with mounting systems that are fixed. Poor image quality in such fixed mounting systems may not be correctable through the use of the projector's focus controls when the cause of the poor image quality concerns the positioning of the projector. Furthermore, the correction of image quality problems even in adjustable mounting systems can be difficult, as many systems that allow for projector adjustments typically are cumbersome and involve several moving parts that need to be manipulated.

SUMMARY

Various embodiments provide a mounting system for use with a variety of devices, in particular projector devices. According to various embodiments, a mounting system comprises an upper adapter plate adjustably connected to a lower adapter plate. The lower adapter plate is configured to attach to a media device, such as a projector. The lower adapter plate is configured to allow for adjustment of the media device's position relative to the upper adapter plate. A first end of a support arm assembly is selectively connected to the upper adapter plate, thereby allowing the support arm assembly to be selectively extended from the upper adapter plate as desired. A second end of the support arm assembly is securely attached to a support bracket assembly that is configured to be adjustably mounted to a support structure. A plurality of adjustment mechanisms operatively connect the upper adapter plate and the lower adapter plate and are positioned at an upper adapter plate top surface, with the adjustment mechanisms positioned in a substantially polygonal arrangement in various embodiments. The plurality of adjustment mechanisms are configured such that operation of each adjustment mechanism results in a corresponding movement of the media device, thereby providing at least one of a yaw rotation, roll rotation and pitch rotation adjustment.

According to one embodiment, the mounting system comprises four adjustment mechanisms operatively connected to the adapter plate assembly. The adjustment mechanisms are positioned in a substantially rectangular arrangement on the adapter plate assembly top surface.

According to another embodiment, the mounting system comprises three adjustment mechanisms operatively connected to the adapter plate assembly, with the adjustment mechanisms being positioned in a substantially triangular arrangement on the adapter plate assembly top surface. In one exemplary arrangement, two of the three adjustment mechanisms are positioned along an adapter plate assembly rear surface. The third adjustment mechanism is positioned along and near a midpoint of an adapter plate assembly front surface. In another exemplary embodiment, two of the three adjustment mechanisms are positioned along an adapter plate assembly front surface, and the third adjustment mechanism is positioned along and near a midpoint of an adapter plate assembly rear surface. The adjustment mechanisms and adapter plate assembly are configured such that operation of each adjustment mechanism results in a corresponding movement of the media device.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
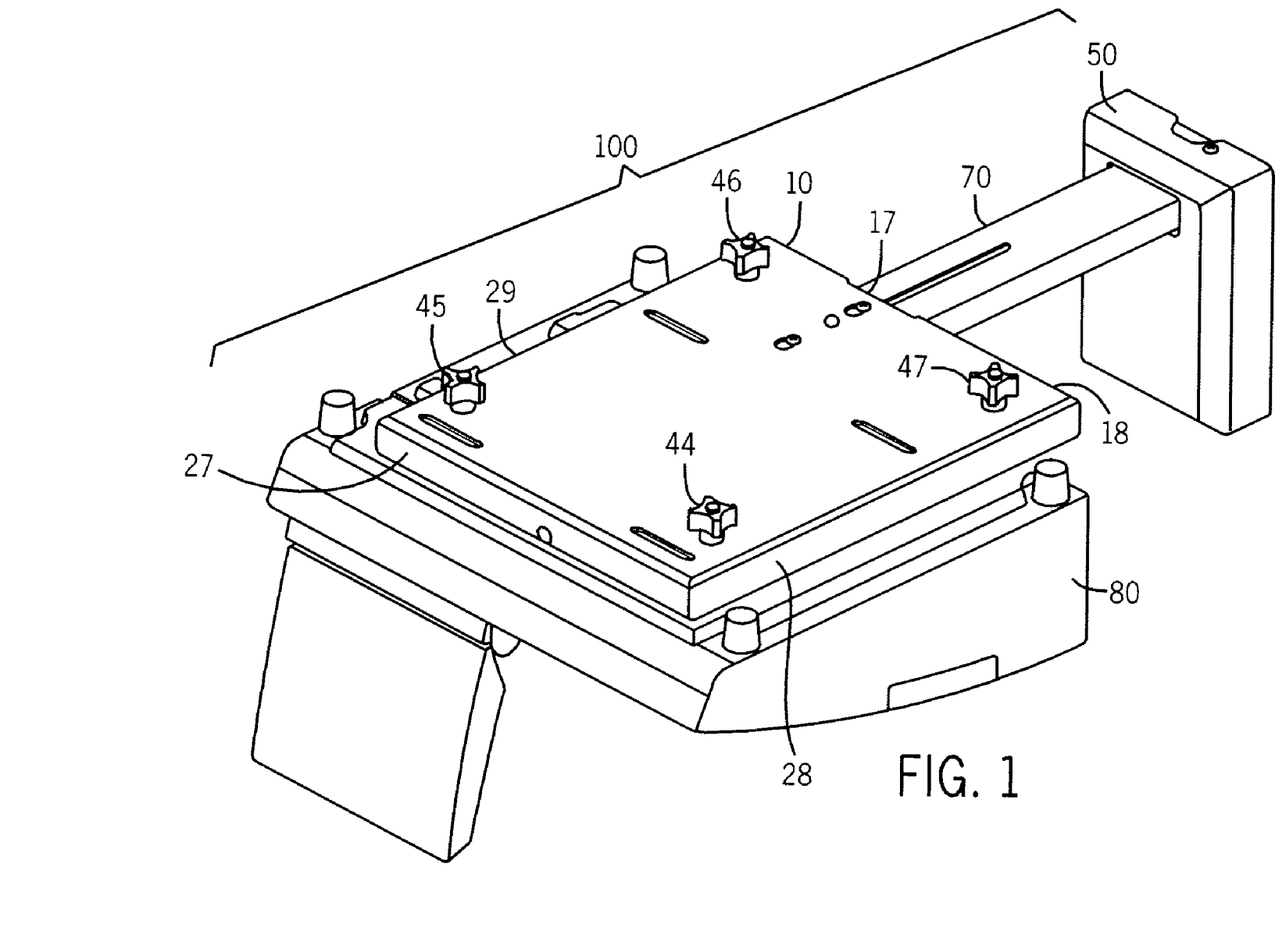
FIG. 1 is a perspective view of a projector mounting system constructed in accordance with one embodiment.
Figure 2:
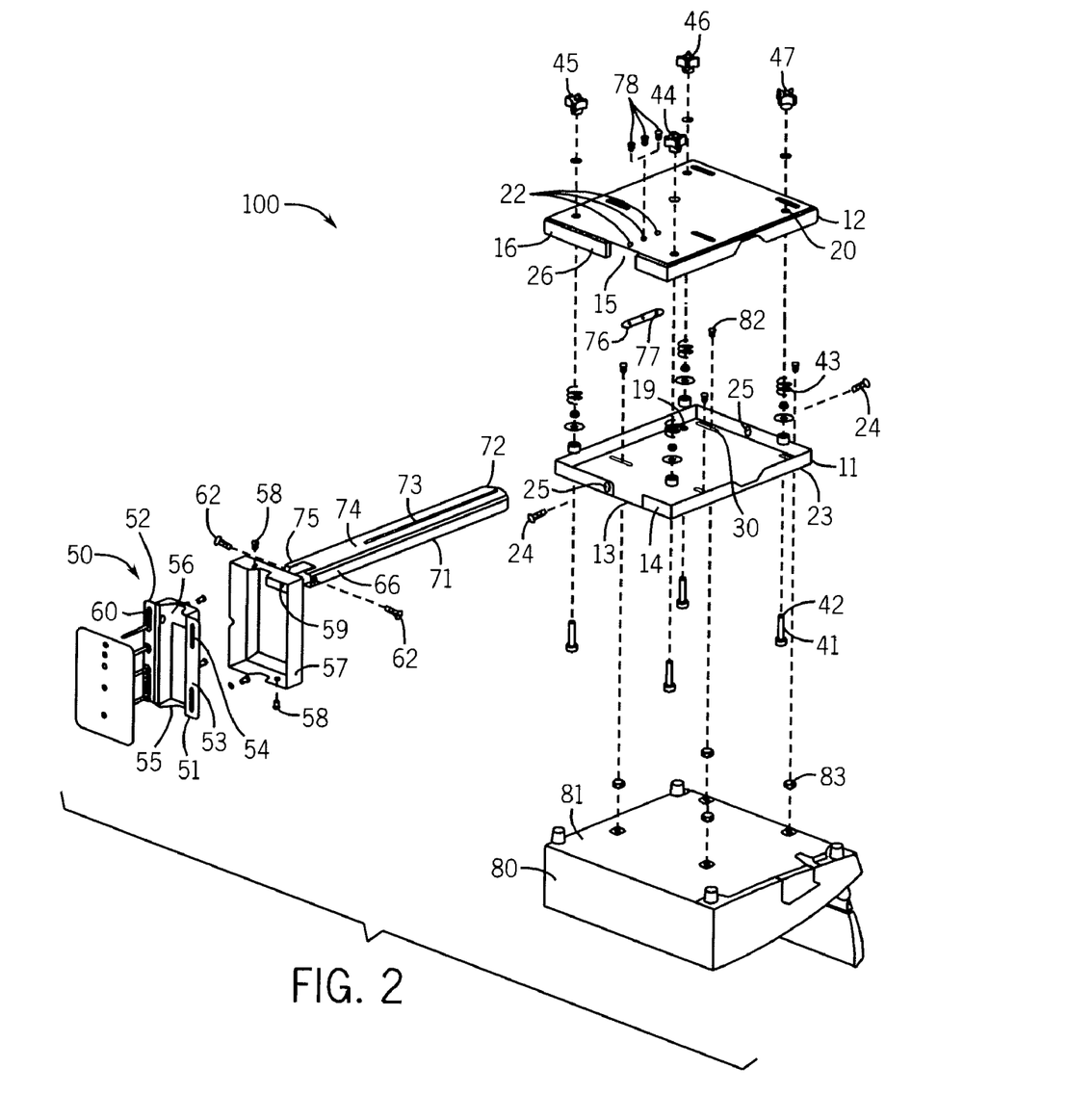
FIG. 2 is an exploded view of the projector mounting system of FIG. 1.
Figure 9:
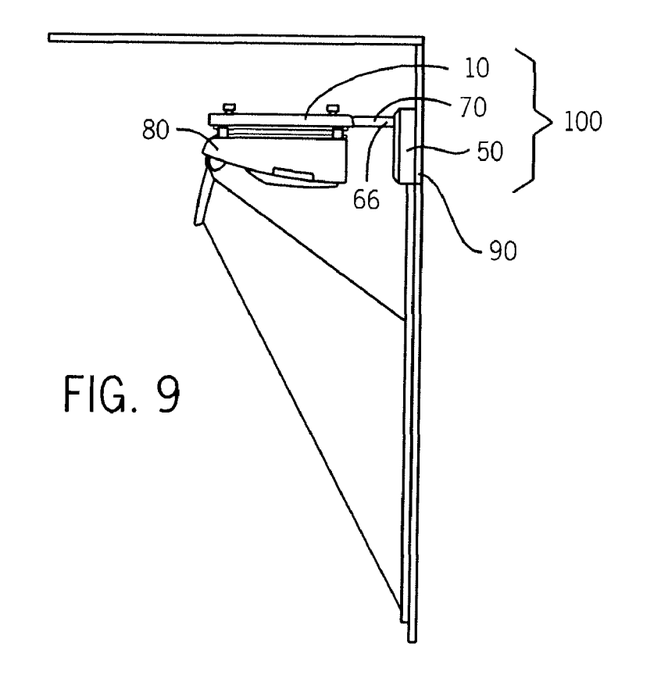
FIG. 9 is a side elevational view of the projector mounting system of FIG. 1 shown mounted to a support structure.

FIGS. 1 and 2 show a projector mounting system 100 constructed in accordance with one embodiment. As shown in FIG. 1, the projector mounting system 100 comprises an adapter plate assembly 10, a support arm assembly 70, a support bracket assembly 50, a first adjustment mechanism 44, a second adjustment mechanism 45, a third adjustment mechanism 46 and a fourth adjustment mechanism 47. A projector 80 or other media device can be installed in the projector mounting system 100 and mounted as illustrated in FIGS. 1 and 9.

Figure 3:
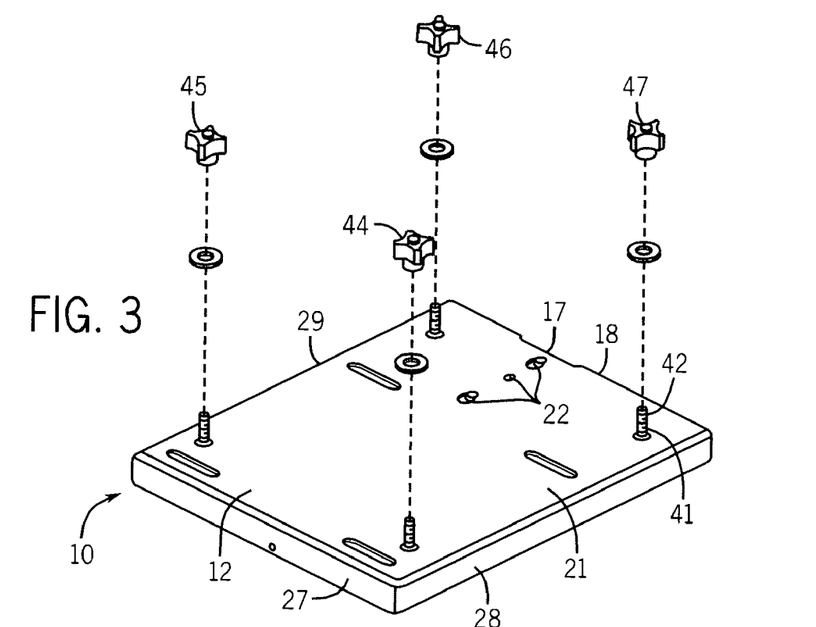
FIG. 3 is an exploded view of an adapter plate assembly and adjustment mechanisms of the projector mounting system of FIG. 1.
Figure 10A:
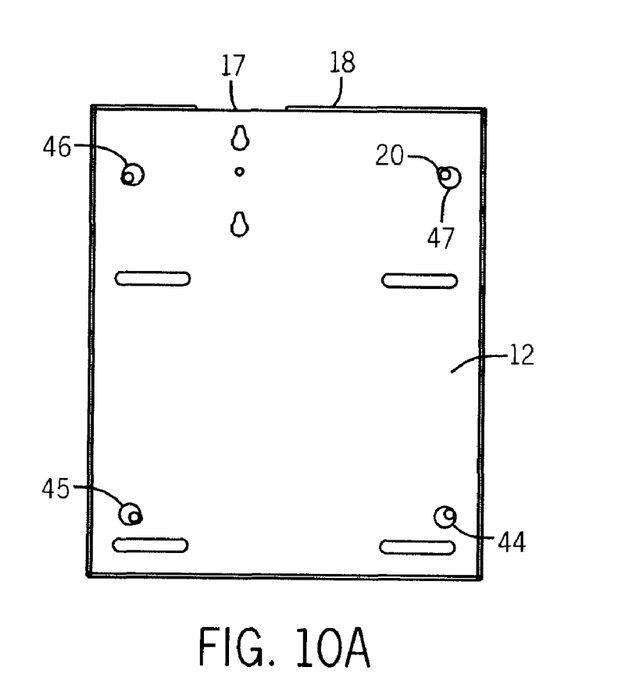
FIG. 10A is a top plan view of the adapter plate assembly of the projector mounting system of FIG. 1

FIG. 2 shows an exploded view of the projector mounting system 100 of FIG. 1. The projector mounting system 100 comprises a lower adapter plate 11 adjustably coupled to an upper adapter plate 12. The lower adapter plate 11 and the upper adapter plate 12 can be adjustably coupled to each other in several ways. By way of example only, the lower adapter plate 11 and the upper adapter plate 12 can be fastened, press fit, snap fit or secured to each other with engaging pins. Furthermore, the lower adapter plate 11 and the upper adapter plate 12 need not be directly coupled to each other. Rather, the adapter plate assembly 10 can comprise additional intermediate components (not shown) which serve to couple the lower adapter plate 11 to the upper adapter plate 12. The lower adapter plate 11 includes a first lower adapter plate opening 13 on a lower adapter plate rear surface 14, and the upper adapter plate 12 includes a first upper adapter plate opening 15 on an upper adapter plate rear surface 16. When the lower adapter plate 11 is adjustably coupled to the upper adapter plate 12, the first lower adapter plate opening 13 and the first upper adapter plate opening 15 are aligned. Thus, as shown in FIGS. 3 and 10A, for example, an adapter plate assembly opening 17 is formed in an adapter plate assembly rear surface 18.

Referring to FIG. 2, the lower adapter plate 11 includes a set of second lower adapter plate openings 19, and the upper adapter plate 12 includes a set of second upper adapter plate openings 20. The set of second upper adapter plate openings 20 can be formed, for example, as slots in the upper adapter plate 12. When the lower adapter plate 11 and the upper adapter plate 12 are coupled together, the set of second lower adapter plate openings 19 and the set of second upper adapter plate openings 20 are aligned and correspond to the locations of the first adjustment mechanism 44, the second adjustment mechanism 45, the third adjustment mechanism 46 and the fourth adjustment mechanism 47. As shown in FIG. 2, for example, an adjustment mechanism arm 41, such as a carriage bolt, is positioned through both the lower adapter plate 11 and the upper adapter plate 12 where the second lower adapter plate openings 19 and the second upper adapter plate openings 20 are located. As shown in FIG. 3, each of the adjustment mechanisms is secured to a protruding portion 42 of a respective adjustment mechanism arm 41 located at an upper adapter plate top surface 21.

As shown in FIG. 2, for example, a biasing member 43 may be provided to bias the first adjustment mechanism 44, the second adjustment mechanism 45, the third adjustment mechanism 46 and the fourth adjustment mechanism 47 in a direction away from the upper adapter plate 12. The biasing member 43 is compressed when the lower adapter plate 11 and the upper adapter plate 12 are coupled to each other. The biasing member 43 fits around the adjustment mechanism arm 41 such that, when the first adjustment mechanism 44, the second adjustment mechanism 45, the third adjustment mechanism 46 and the fourth adjustment mechanism 47 are secured to the protruding portion 42 of the respective adjustment mechanism arm 41, the upper adapter plate 12 compresses the biasing member 43 against the lower adapter plate 11. The compression of the biasing members 43 exerts a force on the first adjustment mechanism 44, the second adjustment mechanism 45, the third adjustment mechanism 46 and the fourth adjustment mechanism 47, forcing them in a direction away from the upper adapter plate 12.

Figure 5:
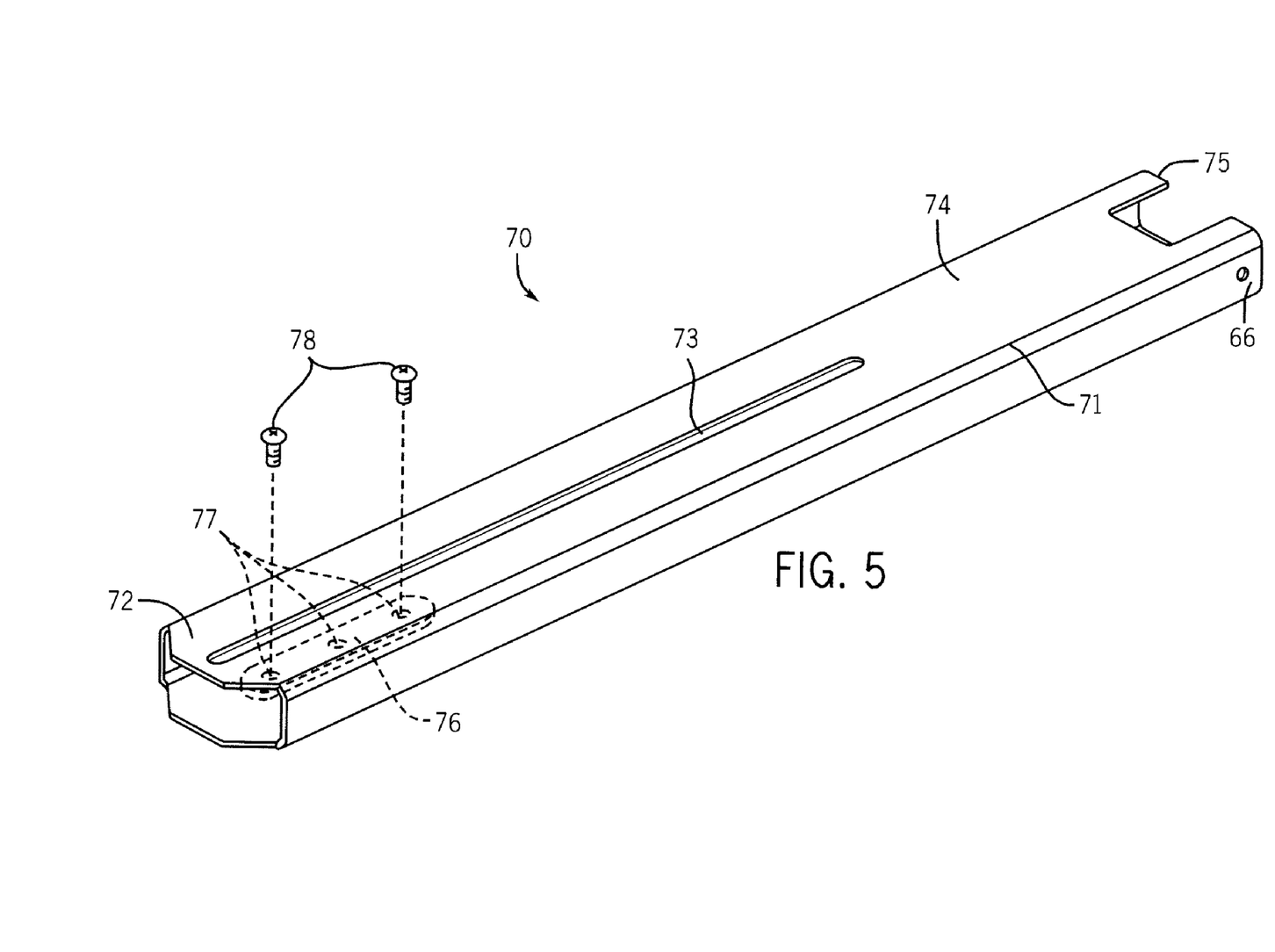
FIG. 5 is a perspective view of the support arm assembly of the projector mounting system of FIG. 1.

As shown in FIG. 5, the support arm assembly 70 comprises a support arm 71 including a support arm slot 73 formed in a support arm top surface 74, the support arm slot 73 extending from a first end 72 of the support arm 71 toward a second end 75 of the support arm 71. The support arm assembly 70 further comprises a support arm plate 76 that is disposed within the support arm 71. The support arm plate 76 includes at least one support arm plate opening 77.

As shown in FIG. 2, at least one support arm opening 22 is formed in the upper adapter plate 12. When the support arm 71 is inserted into the first upper adapter plate opening 15, the support arm openings 22 are aligned with the support arm slot 73 in the support arm top surface 74 and the support arm plate openings 77 in the support arm plate 76. The upper adapter plate 12, the support arm 71 and the support arm plate 76 can be secured with support arm fasteners 78.

Referring to FIG. 2, the support bracket assembly 50 comprises a support bracket 51 that is configured to securely attach the second end 75 of the support arm 71. In an exemplary embodiment, the support bracket 51 comprises a first contact surface 52 and a second contact surface 53. The first contact surface 52 further comprises a first contact surface slot 60, and the second contact surface 53 further comprises a second contact surface slot 54. The first contact surface slot 60 and the second contact surface slot 54 allow the support bracket 51 to be adjustably mounted. For example, as shown in FIG. 9, the support bracket assembly 50 is shown adjustably mounted to a support structure 90. Referring to FIG. 2, the support bracket 51 further comprises an elevated surface 55 including a receiving region 56 through which the second end 75 of the support arm 71 passes. When positioned through the receiving region 56, the second end 75 of the support arm may be attached to the support bracket 51 through the use of a plurality of securing bolts 62 (M10 bolts in one particular embodiment) or other types of fastening mechanisms that pass through support bracket side surfaces 64 and support arm side surfaces 66. In this arrangement, the points of connection between the support bracket 51 and the support arm 71 may serve as a fulcrum for the support arm 71. The support bracket assembly 50 may further comprise a cover 57 that is configured to be coupled to the support bracket 51. The cover 57 can be coupled to the support bracket 51 in several ways, including, for example, by a set of support bracket fasteners 58 or by a snap fit.

Figure 6:
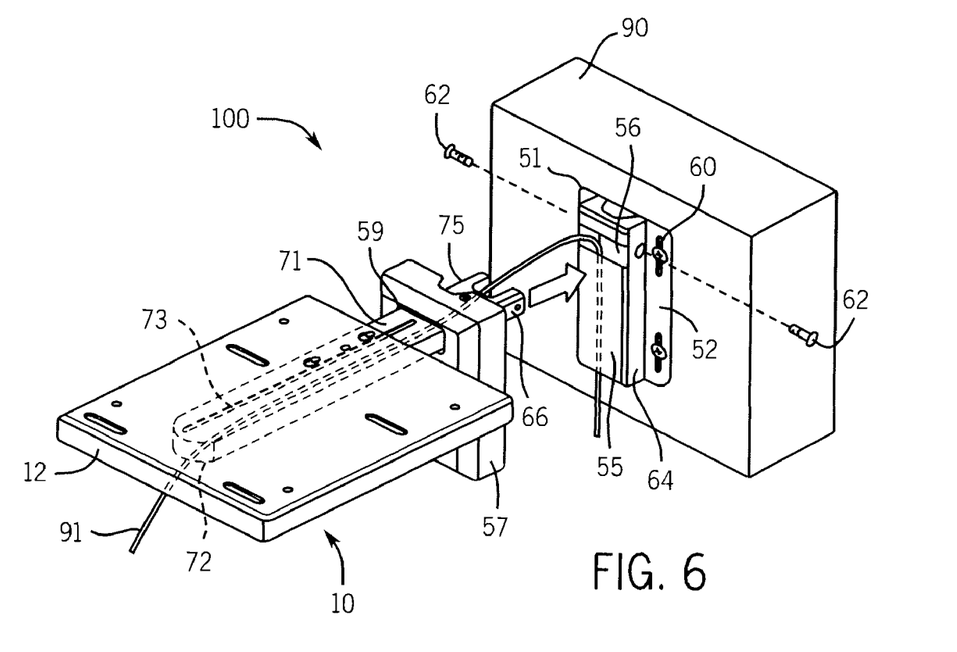
FIG. 6 is an exploded perspective view of the adapter plate assembly, the support arm assembly and a support bracket assembly of the projector mounting system of FIG. 1.

An explanation of securing the projector mounting system 100 and projector 80 to the support structure 90 follows. Once a desired height is determined, as shown in FIG. 9, the support bracket assembly 50 is secured to the support structure 90. As shown in FIG. 6, the support bracket 51 is mounted to the support structure 90 via the first contact surface slot 60 and the second contact surface slot 54 (best shown in FIG. 2). The height may be further adjusted along a length of the first contact surface slot 60 and the second contact surface slot (not shown) before the support bracket 51 is secured to the support structure 90.

Figure 4:
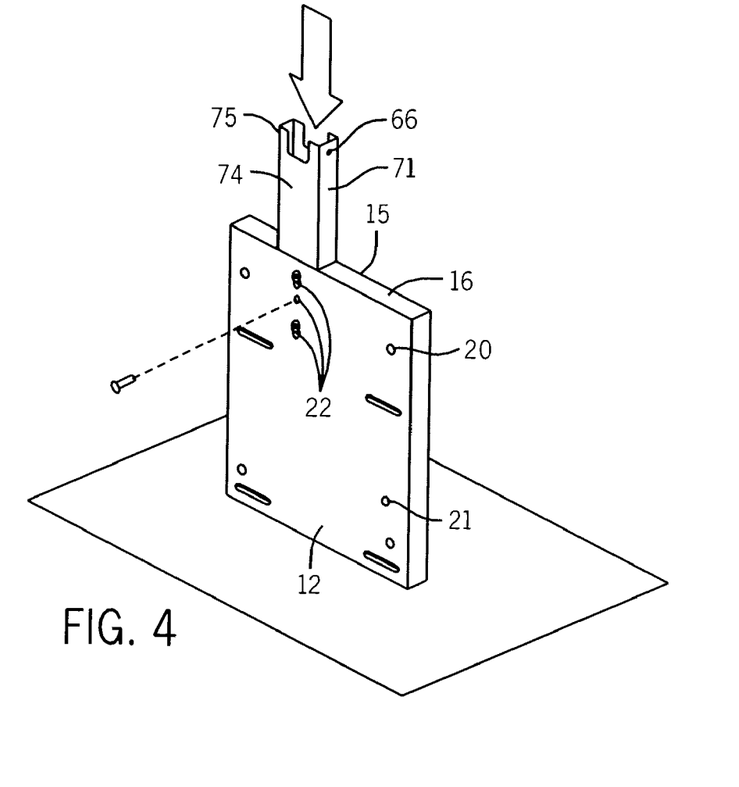
FIG. 4 is a perspective view of an adapter plate assembly and a support arm assembly of the projector mounting system of FIG. 1.

As shown in FIG. 4, the support arm 71 is slidably attached to the upper adapter plate 12 via the set of support arm openings 22. As shown in FIG. 2, the first end 72 of the support arm 71 is inserted into the first upper adapter plate opening 15 of the upper adapter plate 12, the support arm slot 73 and the set of support arm openings 22 being aligned. The support arm plate 76 is inserted into the support arm 71, with the support arm plate openings 77 aligned with the support arm slot 73 and the support arm openings 22. Support arm fasteners 78 connect the support arm 71, the upper adapter plate 12 and the support arm plate 76 at the support arm slot 73, the set of support arm openings 22 and the support arm plate openings 77. The support arm 71 can be adjusted in relation to the upper adapter plate 12 and the support arm plate 76 along a length of the support arm slot 73. As shown in FIG. 6, the support arm 71 can be extended from or retracted into the adapter plate assembly 10 along the support arm slot 73. Once a desired distance from the support structure 90 is obtained, as shown in FIG. 9, the support arm assembly 70 is secured to the adapter plate assembly 10.

Other configurations of the support arm assembly 70 are achievable wherein, for example, the support arm assembly 70 is not partially disposed within the adapter plate assembly 10. For instance, the support arm assembly 70 could alternately be slidably attached to the upper adapter plate top surface 21, the support arm assembly 70 being positioned outside of the adapter plate assembly 10.

As shown in FIG. 6, the second end 75 of the support arm 71 is passed through a cover opening 59 of the cover 57 before the second end 75 of the support arm 71 is secured to the receiving region 56 of the support bracket 51. Furthermore, the projector mounting system 100 can be configured to manage cords 91 required by the projector. In particular, the support arm 71 is configured to allow cords 91 to be routed from the first end 72 of the support arm 71 to the second end 75 of the support arm 71. Thereafter, the cords 91 are allowed to pass through the receiving region 56 of the support bracket 51. After desired adjustments are made to the positioning of the support bracket 51 along the length of the first contact surface slot 60 and the second contact surface slot 54 (shown in FIG. 1), the cover 57 is secured to the support bracket 51.

Figure 7:
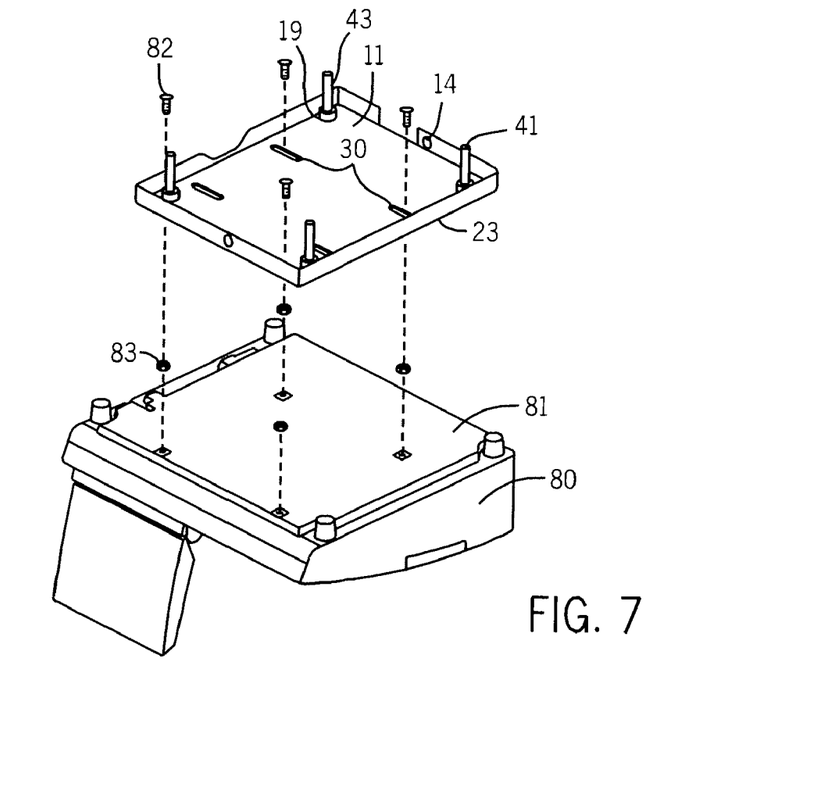
FIG. 7 is an exploded perspective view showing a lower adapter plate and a projector of the projector mounting system of FIG. 1.

As shown in FIG. 7, the lower adapter plate 11 is coupled to the projector 80 such that a lower adapter plate bottom surface 23 faces a projector top surface 81. The adjustment mechanism arms 41 are placed in the set of second lower adapter plate openings 19, and the biasing members 43 are placed around the adjustment mechanism arms 41. The lower adapter plate 11 is then secured to the projector 80 with a set of media device fasteners 82. Spacers 83 can be used to provide a space between the projector top surface 81 and the lower adapter plate bottom surface 23. The set of media device fasteners 82 pass through third lower adapter plate openings 30 formed in the lower adapter plate 11. The third lower adapter plate openings 30 can be formed as slots as shown in FIG. 7. The third lower adapter plate openings 30 are oriented in a direction parallel to the lower adapter plate rear surface 14. Thus, the projector 80 can be adjusted in the direction of the third lower adapter plate openings 30, or side-to-side, before the set of media device fasteners 82 are tightened to secure the projector 80 to the lower adapter plate 11.

Figure 8:
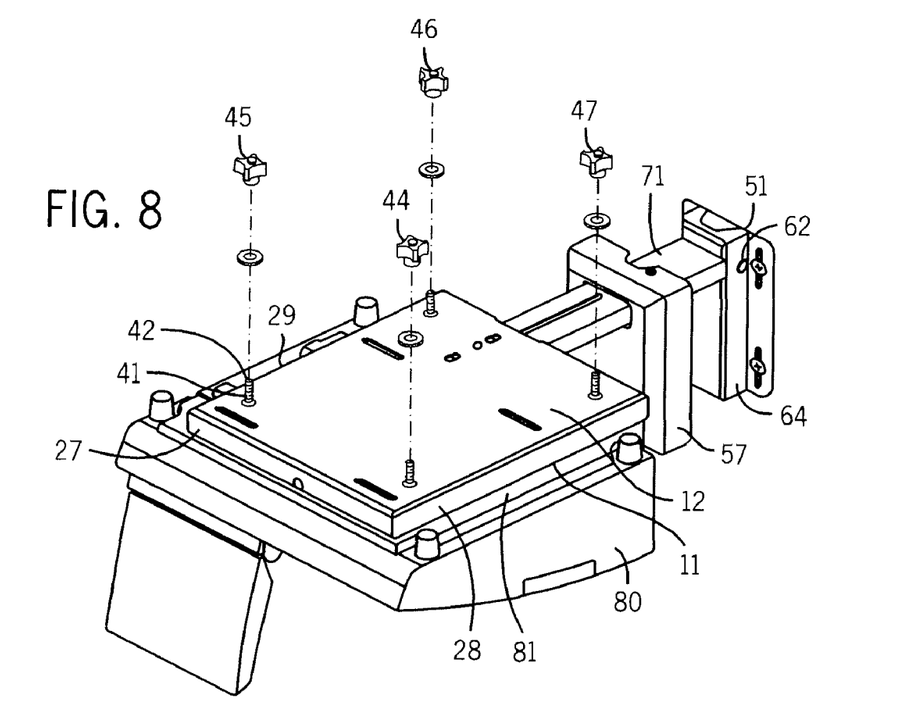
FIG. 8 is an exploded perspective view of the adapter plate assembly, the support arm assembly, the support bracket assembly and the projector of the projector mounting system of FIG. 1.

Referring to FIG. 2, once the projector 80 is secured to the lower adapter plate 11, the lower adapter plate 11 and the upper adapter plate 12 are secured together. The lower adapter plate 11 and the upper adapter plate 12 can be secured using adapter plate fasteners 24 passing through a set of fourth lower adapter plate openings 25 in the lower adapter plate 11 and a set of third upper adapter plate openings 26 in the upper adapter plate 12. The fourth lower adapter plate openings 25 in the lower adapter plate 11 are formed to allow the adapter plate fasteners 24 limited movement, thereby allowing for movement of the lower adapter plate 11 relative to the upper adapter plate 12. When the lower adapter plate 11 and the upper adapter plate 12 are brought together, the adjustment mechanism arms 41 pass through the set of second upper adapter plate openings 20 formed in the upper adapter plate 11. As shown in FIG. 8, the first adjustment mechanism 44, the second adjustment mechanism 45, the third adjustment mechanism 46 and the fourth adjustment mechanism 47 are coupled to the protruding portions 42 of the respective adjustment mechanism arms 41. Securing the first adjustment mechanism 44, the second adjustment mechanism 45, the third adjustment mechanism 46 and the fourth adjustment mechanism 47 to the protruding portions 42 of the respective adjustment mechanism arms 41 also acts to secure the upper adapter plate 12 to the lower adapter plate 11.

Referring to FIG. 3, the first adjustment mechanism 44 is positioned on the upper adapter plate top surface 21 adjacent an adapter plate assembly front surface 27 and a first adapter plate assembly side surface 28. The second adjustment mechanism 45 is positioned on the upper adapter plate top surface 21 adjacent the adapter plate assembly front surface 27 and a second adapter plate assembly side surface 29. The third adjustment mechanism 46 is positioned on the upper adapter plate top surface 21 adjacent the adapter plate assembly rear surface 18 and the second adapter plate assembly side surface 29. The fourth adjustment mechanism 47 is positioned on the upper adapter plate top surface 21 adjacent the adapter plate assembly rear surface 18 and the first adapter plate assembly side surface 28.

Figure 10B:
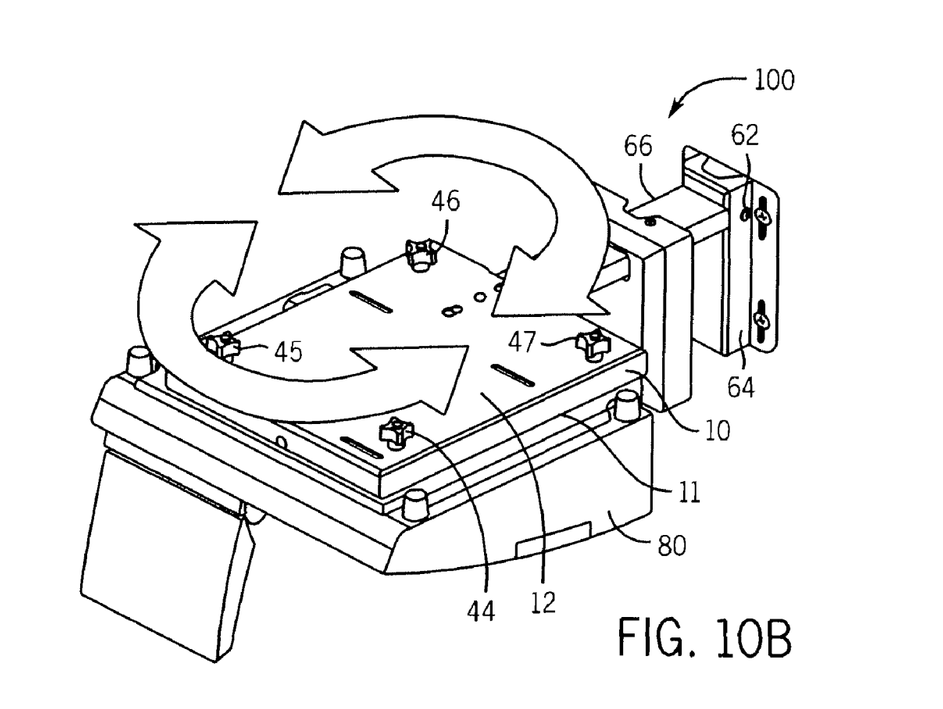
FIG. 10B is a perspective view showing how yaw rotation adjustment is implemented in the projector mounting system of FIG. 1.
Figure 11:
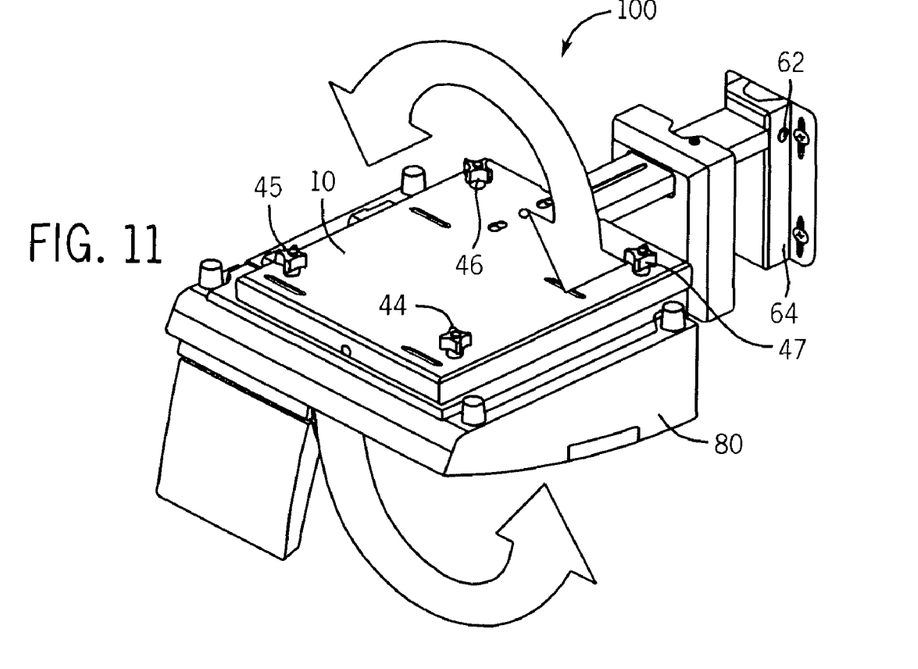
FIG. 11 is a perspective view showing how roll rotation adjustment is implemented in the projector mounting system of FIG. 1.
Figure 12:
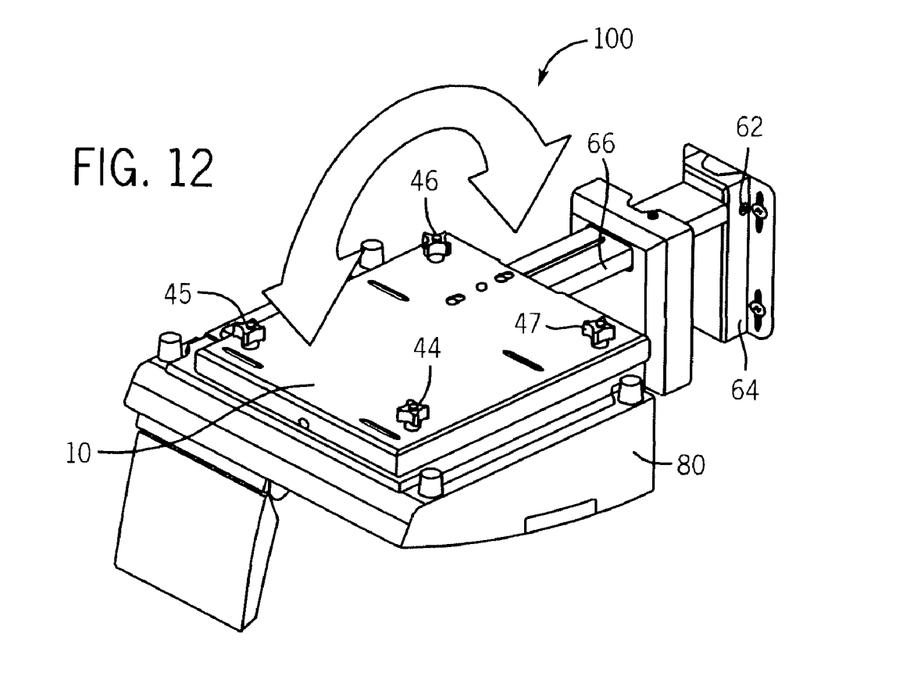
FIG. 12 is a perspective view showing how pitch rotation adjustment is implemented in the projector mounting system of FIG. 1.

Referring to FIGS. 10B, 11 and 12, various focal point adjustments of the projector mounting system 100 are shown. As shown in FIG. 10B, the projector mounting system 100 is capable of a yaw rotation adjustment, or swivel adjustment, by movement of the first adjustment mechanism 44, the second adjustment mechanism 45, the third adjustment mechanism 46 and the fourth adjustment mechanism 47. Referring to FIG. 10A, the yaw rotation adjustment is achieved by moving the first adjustment mechanism 44, the second adjustment mechanism 45, the third adjustment mechanism 46 and the fourth adjustment mechanism 47 in the set of second upper adapter plate openings 20, which are formed as slots in the upper adapter plate 12. By manipulating the first adjustment mechanism 44, the second adjustment mechanism 45, the third adjustment mechanism 46 and the fourth adjustment mechanism 47 in a clockwise or counterclockwise direction in the manner indicated in FIG. 10B, the lower adapter plate 11 is forced to rotate by the interaction of the adjustment mechanism arms 41 with the set of second lower adapter plate openings 19 shown in FIG. 2 (the projector 80 itself may also be adjusted by hand in order to aid in the yaw adjustment). Referring to FIG. 7, the movement of the lower adapter plate 11 forces the projector 80 to rotate in a likewise manner because the lower adapter plate 11 is coupled to the projector 80 by the media device fasteners 82. Referring to FIG. 8, the lower adapter plate 11 is capable of slight movement with respect to the upper adapter plate 12. Thus, the lower adapter plate 11 rotates until the first adjustment mechanism 44, the second adjustment mechanism 45, the third adjustment mechanism 46 and the fourth adjustment mechanism 47 and the corresponding adjustment mechanism arms 41 are positioned in the corners of the set of second upper adapter plate openings 20, which have been formed as slots as shown in FIG. 10A.

As shown in FIG. 11, the projector mounting system 100 is also capable of roll rotation adjustment. To adjust the roll rotation, the first adjustment mechanism 44 and the fourth adjustment mechanism 47 are turned in one direction (either clockwise or counterclockwise), and the second adjustment mechanism 45 and the third adjustment mechanism 46 are turned in the opposite direction. Referring to FIG. 8, operation of the first adjustment mechanism 44, the second adjustment mechanism 45, the third adjustment mechanism 46 and the fourth adjustment mechanism 47 causes the corresponding adjustment mechanism arms 41 to move either toward or away from the projector top surface 81. The adjustment mechanisms moving toward the projector top surface 81 cause the corresponding locations of the lower adapter plate 11 to move away from the upper adapter plate 12, resulting in a corresponding adjustment of the position of the projector 80. Operation of the first adjustment mechanism 44 and the fourth adjustment mechanism 47 in the same manner results in the same corresponding movement of their respective adjustment mechanism arms 41. Conversely, operation of the second adjustment mechanism 45 and the third adjustment mechanism 46 in the opposite direction results in a movement of their respective adjustment mechanism arms 41 in a direction opposite that of the adjustment mechanism arms 41 corresponding to the first adjustment mechanism 44 and the fourth adjustment mechanism 47. As a result, the projector 80 is capable of rotating in the manner indicated in FIG. 11.

As shown in FIG. 12, the projector mounting system 100 is further capable of pitch rotation adjustment. To adjust the pitch rotation, the first adjustment mechanism 44 and the second adjustment mechanism 45 are turned in one direction (either clockwise or counterclockwise), and the third adjustment mechanism 46 and the fourth adjustment mechanism 47 are turned in the opposite direction. Referring to FIG. 8, operation of the first adjustment mechanism 44 and the second adjustment mechanism 45 in the same manner results in the same corresponding movement of their respective adjustment mechanism arms 41. Conversely, operation of the third adjustment mechanism 46 and the fourth adjustment mechanism 47 in the opposite direction results in a movement of their respective adjustment mechanism arms 41 in a direction opposite that of the adjustment mechanism arms 41 corresponding to the first adjustment mechanism 44 and the second adjustment mechanism 45. As a result, the projector 80 is capable of rotating in the manner indicated in FIG. 12.

Additionally, the projector mounting system 100 is capable of a combination of pitch and roll rotation adjustments. Referring to FIGS. 11 and 12, to achieve a combination of pitch and roll rotation adjustments, for example, the first adjustment mechanism 44 and the third adjustment mechanism 46 are not adjusted. The second adjustment mechanism 45 is turned in one direction, and the fourth adjustment mechanism 47 is turned in the opposite direction. Alternately, the second adjustment mechanism 45 and the fourth adjustment mechanism 47 are not adjusted while the first adjustment mechanism 44 and the third adjustment mechanism 46 are turned in opposite directions. Further adjustments of the projector 80 can be made by turning any of the adjustment mechanisms individually. The projector mounting system 100 is capable of performing any combination of yaw rotation, roll rotation and pitch rotation adjustments through various manipulations of the adjustment mechanisms.

Figure 13:
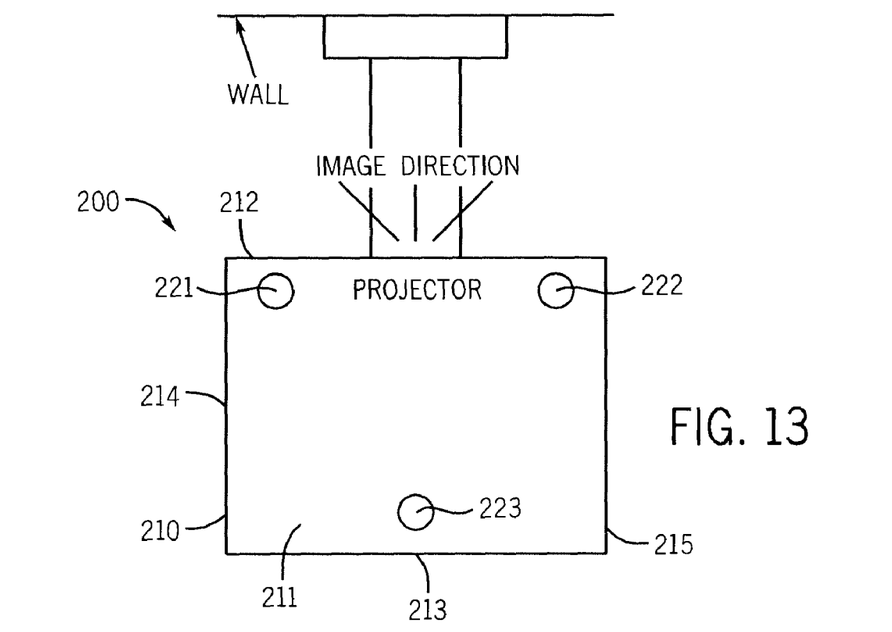
FIG. 13 is a top view of a projector mounting system constructed in accordance with another embodiment.

FIG. 13 shows a projector mounting system 200 constructed in accordance with another embodiment. The projector mounting system 200 comprises a first adjustment mechanism 221, a second adjustment mechanism 222 and a third adjustment mechanism 223 to control the various adjustments of the image. An adapter plate assembly 210 is configured to operate with the first adjustment mechanism 221, the second adjustment mechanism 222 and the third adjustment mechanism 223 in a fashion similar to the operation of the projector mounting system 100 as already described. In the projector mounting system 200 shown in FIG. 13, the first adjustment mechanism 221 and the second adjustment mechanism 222 are positioned on an adapter plate assembly top surface 211 and along an adapter plate assembly rear surface 212. Further, the first adjustment mechanism 221 is positioned adjacent a first adapter plate assembly side surface 214, and the second adjustment mechanism 222 is positioned adjacent a second adapter plate assembly side surface 215. The third adjustment mechanism 223 is positioned on the adapter plate assembly top surface 211 and adjacent an adapter plate assembly front surface 213. The third adjustment mechanism 223 is located near a midpoint of the adapter plate assembly front surface 213.

The projector mounting system 200 is capable of the same image focal point adjustments as the projector mounting system 100: yaw, roll, pitch and any combination including yaw/roll/pitch rotation adjustments. To adjust the yaw rotation of the projector mounting system 200, the first adjustment mechanism 221, the second adjustment mechanism 222 and the third adjustment mechanism 223 are adjusted in corners of slots (not shown) formed in the adapter plate assembly top surface 211, in a manner substantially similar to the projector mounting system 100. To adjust the roll rotation of the projector mounting system 200, the first adjustment mechanism 221 and the second adjustment mechanism 222 are rotated in opposite directions while the third adjustment mechanism 223 is not adjusted. To adjust the pitch rotation of the projector mounting system 200, both the first adjustment mechanism 221 and the second adjustment mechanism 222 are rotated in the same direction while the third adjustment mechanism 223 is rotated in an opposite direction. Several operations are possible to perform a combination roll/pitch rotation adjustment. For example, the first adjustment mechanism 221 is not adjusted while the second adjustment mechanism 222 and the third adjustment mechanism 223 are rotated in opposite directions. Further, for example, the second adjustment mechanism 222 is not adjusted while the first adjustment mechanism 221 and the third adjustment mechanism 223 are rotated in opposite directions. The projector mounting system 200 is capable of performing any combination of yaw rotation, roll rotation and pitch rotation adjustments through various manipulations of the adjustment mechanisms.

Figure 14:
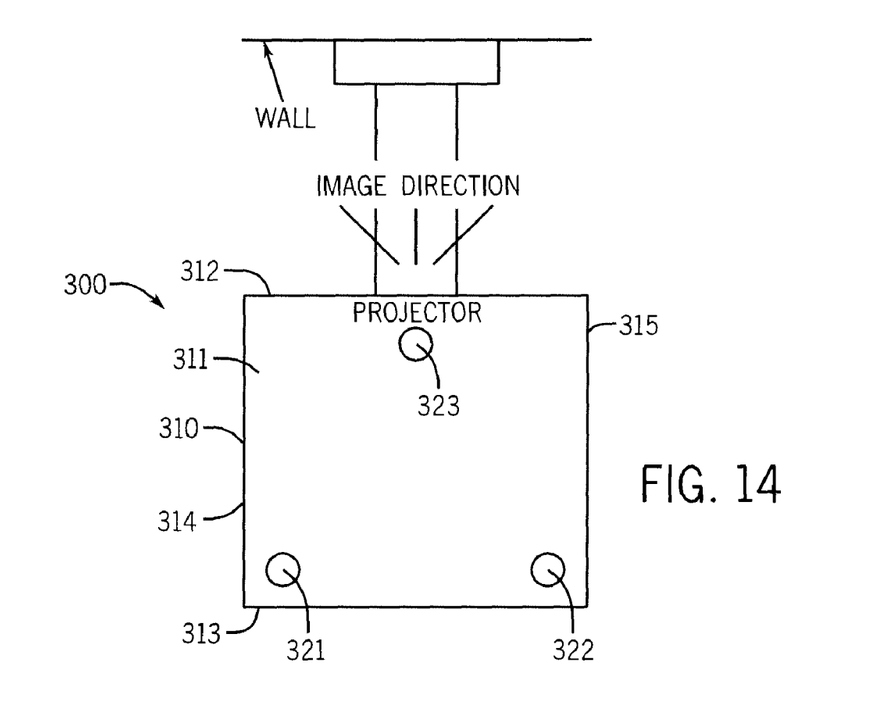
FIG. 14 is a top view of a projector mounting system constructed in accordance with still another embodiment.

FIG. 14 shows a projector mounting system 300 constructed in accordance with yet another embodiment. The projector mounting system 300 comprises a first adjustment mechanism 321, a second adjustment mechanism 322 and a third adjustment mechanism 323 to control the various adjustments of the image. An adapter plate assembly 310 is configured to operate with the first adjustment mechanism 321, the second adjustment mechanism 322 and the third adjustment mechanism 323 in a fashion similar to the operation of projector mounting system 100 as already described. In the projector mounting system 300 shown in FIG. 14, the first adjustment mechanism 321 and the second adjustment mechanism 322 are positioned on an adapter plate assembly top surface 311 and along an adapter plate assembly front surface 313. Further, the first adjustment mechanism 321 is positioned adjacent a first adapter plate assembly side surface 314, and the second adjustment mechanism 322 is positioned adjacent a second adapter plate assembly side surface 315. The third adjustment mechanism 323 is positioned on the adapter plate assembly top surface 311 and adjacent an adapter plate assembly rear surface 312. The third adjustment mechanism 323 is located near a midpoint of the adapter plate assembly rear surface 312.

The projector mounting system 300 is capable of the same image focal point adjustments as the projector mounting system 100: yaw, roll, pitch and any combination including yaw/roll/pitch rotation adjustments. To adjust the yaw rotation of the projector mounting system 300, the first adjustment mechanism 321, the second adjustment mechanism 322 and the third adjustment mechanism 323 are adjusted in corners of slots (not shown) formed in the adapter plate assembly top surface 311, in a manner substantially similar to the projector mounting system 100. To adjust the roll rotation of the projector mounting system 300, the first adjustment mechanism 321 and the second adjustment mechanism 322 are rotated in opposite directions while the third adjustment mechanism 323 is not adjusted. To adjust the pitch rotation of the projector mounting system 300, both the first adjustment mechanism 321 and the second adjustment mechanism 322 are rotated in the same direction while the third adjustment mechanism 323 is rotated in an opposite direction. Several operations are possible to perform a combination roll/pitch rotation adjustment. For example, the first adjustment mechanism 321 is not adjusted while the second adjustment mechanism 322 and the third adjustment mechanism 323 are rotated in opposite directions. Further, for example, the second adjustment mechanism 322 is not adjusted while the first adjustment mechanism 321 and the third adjustment mechanism 323 are rotated in opposite directions. The projector mounting system 300 is capable of performing any combination of yaw rotation, roll rotation and pitch rotation adjustments through various manipulations of the adjustment mechanisms.

Figure 15:
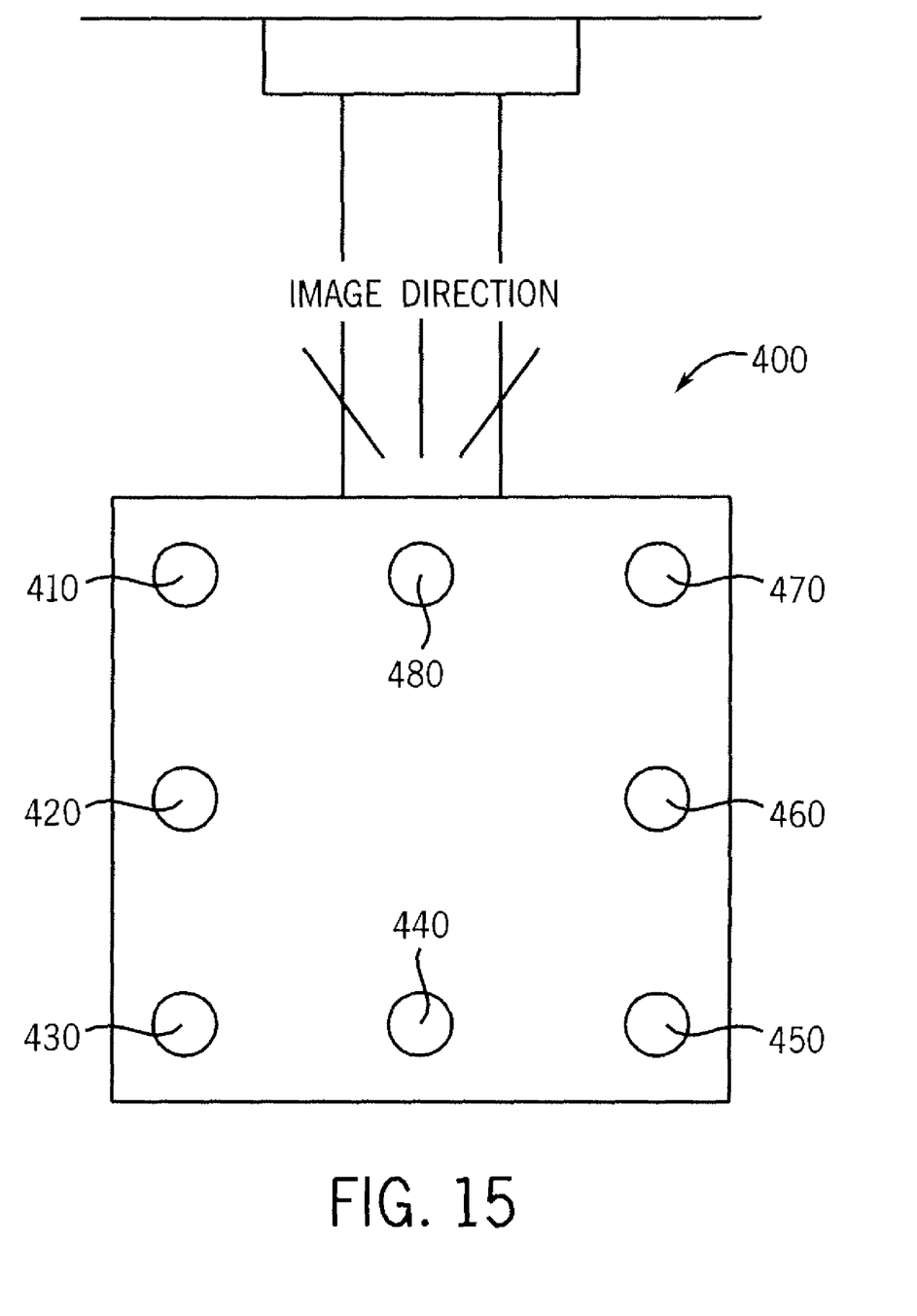
FIG. 15 is a top view of a projector mounting system constructed in accordance with yet another embodiment.

In addition to the above, it should be noted that various other arrangements of adjustment mechanisms are also possible, and it is also possible to vary the number of adjustment mechanisms that are used. For example, FIG. 15 shows a projector mounting system 400 with a six-adjustment mechanism arrangement, with a first adjustment mechanism 410, a second adjustment mechanism 420, a third adjustment mechanism 430, a fourth adjustment mechanism 440, a fifth adjustment mechanism 450 and a sixth adjustment mechanism 460 arranged in a polygonal arrangement.

The foregoing description of various embodiments have been presented for purposes of illustration and description. It is not intended to be exhaustive or to limit the present invention to the precise form disclosed, and modifications and variations are possible in light of the above teachings or may be acquired from practice of the present invention. By way of example only, it should be noted that the projector mounting systems discussed herein could be mounted to a wall or other support surface in a configuration substantially opposite from that shown in FIG. 9, whereby the projector 80 or other media device is mounted above the projector mounting system instead of below it, and other mounting configurations are also possible. The embodiments were chosen and described in order to explain the principles of the present invention and its practical application to enable one skilled in the art to utilize the present invention in various embodiments and with various modifications as are suited to the particular use contemplated.

What is claimed is:

1. A mounting system, comprising:
   an upper adapter plate adjustably connected to a lower adapter plate, the lower adapter plate being configured to adjustably connect to a media device;
   a support arm assembly selectively and operatively connected at a first end thereof to the upper adapter plate;
   a support bracket assembly operatively connected to a second end of the support arm assembly, the support bracket assembly configured to adjustably mount to a support structure; and
   a plurality of adjustment mechanisms adjustably and operatively connecting the upper adapter plate and the lower adapter plate, the plurality of adjustment mechanisms collectively configured to adjust the position of the lower adapter plate relative to the upper adapter plate resulting in selective yaw rotation adjustment, selective roll rotation adjustment, and selective pitch rotation adjustment of the lower adapter plate,
   wherein the upper adapter plate comprises a plurality of upper adapter plate openings configured to adjustably receive the plurality of adjustment mechanisms, the plurality of adjustment mechanisms configured to move in relation to the upper adapter plate resulting in a corresponding movement of the lower adapter plate relative to the upper adapter plate and the yaw rotation adjustment of the lower adapter plate.

2. The mounting system of claim 1, wherein the lower adapter plate is tiltable about a plurality of axes in relation to the upper adapter plate, the tilting of the lower adapter plate about the plurality of axes comprising the roll rotation adjustment and the pitch rotation adjustment of the lower adapter plate.

3. The mounting system of claim 2, wherein the support bracket assembly comprises a bracket including a support bracket slot, the bracket configured to adjustably mount to the support structure via the support bracket slot, thereby allowing adjustment of the bracket and correspondingly the lower adapter plate relative to the support structure along a length of the support bracket slot.

4. The mounting system of claim 3, wherein the support arm assembly comprises a support arm including a support arm slot on a support arm top surface thereof, wherein the upper adapter plate includes at least one support arm opening, and wherein the support arm is adjustably connected to the upper adapter plate via the support arm slot and the at least one support arm opening, thereby allowing adjustment of the upper adapter plate and the lower adapter plate relative to the support arm along a length of the support arm slot.

5. The mounting system of claim 4, wherein the lower adapter plate includes a lower adapter plate slot, the lower adapter plate and the media device being operatively connected via the lower adapter plate slot, thereby allowing adjustment of the media device relative to the lower adapter plate along a length of the lower adapter plate slot.

6. The mounting system of claim 5, wherein the plurality of adjustment mechanisms comprises a first adjustment mechanism, a second adjustment mechanism and a third adjustment mechanism on an upper adapter plate top surface.

7. The mounting system of claim 5, wherein the plurality of adjustment mechanisms comprises a first adjustment mechanism, a second adjustment mechanism, a third adjustment mechanism and a fourth adjustment mechanism arranged in a substantially rectangular configuration on an upper adapter plate top surface.

8. A mounting system, comprising:
   an upper adapter plate adjustably connected to a lower adapter plate at a plurality of adjustment points, the lower adapter plate configured to adjustably connect to a media device;
   a support arm assembly selectively and operatively connected at a first end thereof to the upper adapter plate;

a support bracket assembly operatively connected to a second end of the support arm assembly, wherein the support bracket assembly is configured to be mounted to a support structure; and a plurality of adjustment mechanisms adjustably and operatively connecting the upper adapter plate and the lower adapter plate at a plurality of respective corresponding upper adapter plate locations and lower adapter plate locations, each of the plurality of adjustment mechanisms configured to selectively control a distance between one of the plurality of upper adapter plate locations and a corresponding lower adapter plate location, wherein adjustment of one or more of the plurality of adjustment mechanisms selectively alters pitch rotation and roll rotation of the media device in relation to the upper adapter plate when the media device is connected to the lower adapter plate, and wherein the plurality of respective corresponding locations on the upper adapter plate comprise a plurality of upper adapter plate openings configured to adjustably receive the plurality of adjustment mechanisms, the plurality of adjustment mechanisms capable of movement in relation to the upper adapter plate, resulting in a corresponding movement of the lower adapter plate relative to the upper adapter plate and a yaw rotation adjustment of the media device when the media device is connected to the lower adapter plate.

9. The mounting system of claim 8, wherein operation of the plurality of adjustment mechanisms results in a movement of a first lower adapter plate side surface in a direction away from the upper adapter plate and a movement of a second lower adapter plate side surface in a direction toward the upper adapter plate, the movement of the lower adapter plate relative to the upper adapter plate resulting in the roll rotation adjustment of the media device when the media device is connected to the lower adapter plate.

10. The mounting system of claim 9, wherein operation of the plurality of adjustment mechanisms results in a movement of a lower adapter plate front surface in either a direction away from or toward the upper adapter plate and a movement of a lower adapter plate rear surface in either a direction toward or away from the upper adapter plate, the movement of the lower adapter plate relative to the upper adapter plate resulting in the pitch rotation adjustment of the media device when the media device is connected to the lower adapter plate.

11. The mounting system of claim 10, wherein the plurality of adjustment mechanisms comprises a first adjustment mechanism, a second adjustment mechanism and a third adjustment mechanism arranged in a substantially triangular configuration on an upper adapter plate top surface, the first adjustment mechanism and the second adjustment mechanism being positioned adjacent an upper adapter plate rear surface and the third adjustment mechanism being positioned adjacent and near a midpoint of an upper adapter plate front surface.

12. The mounting system of claim 10, wherein the plurality of adjustment mechanisms comprises a first adjustment mechanism, a second adjustment mechanism and a third adjustment mechanism arranged in a substantially triangular configuration on an upper adapter plate top surface, the first adjustment mechanism and the second adjustment mechanism being positioned adjacent an upper adapter plate front surface and the third adjustment mechanism being positioned adjacent and near a midpoint of an upper adapter plate rear surface.

13. The mounting system of claim 10, wherein the plurality of adjustment mechanisms comprises a first adjustment mechanism, a second adjustment mechanism, a third adjustment mechanism and a fourth adjustment mechanism arranged in a substantially rectangular configuration on an upper adapter plate top surface.

14. The mounting system of claim 10, further comprising a plurality of biasing mechanisms, each of the plurality of biasing mechanisms engaging one of the plurality of adjustment mechanisms and configured to bias the respective one of the plurality of adjustment mechanisms away from the upper adapter plate.

15. A mounting system, comprising:

an upper adapter plate adjustably connected to a lower adapter plate, the lower adapter plate being configured to adjustably connect to a media device;

a support arm assembly selectively and operatively connected at a first end thereof to the upper adapter plate;

a support bracket assembly operatively connected to a second end of the support arm assembly, wherein the support bracket assembly is configured to be mounted to a support structure; and a plurality of adjustment mechanisms adjustably and operatively connecting the upper adapter plate and the lower adapter plate, the plurality of adjustment mechanisms collectively configured to adjust the position of a top surface of the media device relative to the upper adapter plate when the media device is connected to the lower adapter plate, resulting in selective yaw rotation adjustment, selective roll rotation adjustment, and selective pitch rotation adjustment of the media device, wherein each of the plurality of adjustment mechanisms comprises a bolt, a first end of the bolt configured to engage a lower adapter plate bottom surface and a second end of the bolt configured to connect to a knob, wherein operation of the knob controls a distance between the first end of the bolt and the knob corresponding to a distance between the upper adapter plate and the lower adapter plate.

16. The mounting system of claim 15, wherein the upper adapter plate comprises upper adapter plate openings configured to adjustably receive the plurality of adjustment mechanisms, the plurality of adjustment mechanisms capable of movement in relation to the upper adapter plate resulting in a corresponding movement of the top surface of the media device relative to the upper adapter plate and the yaw rotation adjustment of the media device when the media device is connected to the lower adapter plate.

17. The mounting system of claim 16, wherein operation of the plurality of adjustment mechanisms results in a movement of a first media device side surface in a direction away from the upper adapter plate and a movement of a second media device side surface in a direction toward the upper adapter plate, the movement of the media device relative to the upper adapter plate resulting in the roll rotation adjustment of the media device when the media device is connected to the lower adapter plate.

18. The mounting system of claim 17, wherein operation of the plurality of adjustment mechanisms results in a movement of a media device front surface in either a direction away from or toward the upper adapter plate and a movement of a media device rear surface in either a direction toward or away from the upper adapter plate, the movement of the media device relative to the upper adapter plate resulting in the pitch rotation adjustment of the media device when the media device is connected to the lower adapter plate.

19. The mounting system of claim 18, wherein the plurality of adjustment mechanisms comprises a first adjustment mechanism, a second adjustment mechanism and a third adjustment mechanism arranged in a substantially triangular configuration on an upper adapter plate top surface.

20. The mounting system of claim 18, wherein the plurality of adjustment mechanisms comprises a first adjustment mechanism, a second adjustment mechanism, a third adjustment mechanism and a fourth adjustment mechanism arranged in a substantially polygonal configuration on an upper adapter plate top surface.

21. A mounting system, comprising:

- an upper adapter plate adjustably connected to a lower adapter plate, the lower adapter plate being configured to adjustably connect to a media device;
- a support arm assembly selectively and operatively connected at a first end thereof to the upper adapter plate;
- a support bracket assembly operatively connected to a second end of the support arm assembly, wherein the support bracket assembly is configured to be mounted to a support structure;
- a plurality of adjustment mechanisms adjustably and operatively connecting the upper adapter plate and the lower adapter plate, the plurality of adjustment mechanisms collectively configured to adjust the position of a top surface of the media device relative to the upper adapter plate when the media device is connected to the lower adapter plate, resulting in selective yaw rotation adjustment, selective roll rotation adjustment, and selective pitch rotation adjustment of the media device; and
- a plurality of biasing mechanisms, each of the plurality of biasing mechanisms engaging one of the plurality of adjustment mechanisms and configured to bias the respective one of the plurality of adjustment mechanisms away from the upper adapter plate.

* * * * *